March 27, 1951 — M. FLEISCHER — 2,546,666
SELF-EXAMINATION DEVICE
Filed May 6, 1946
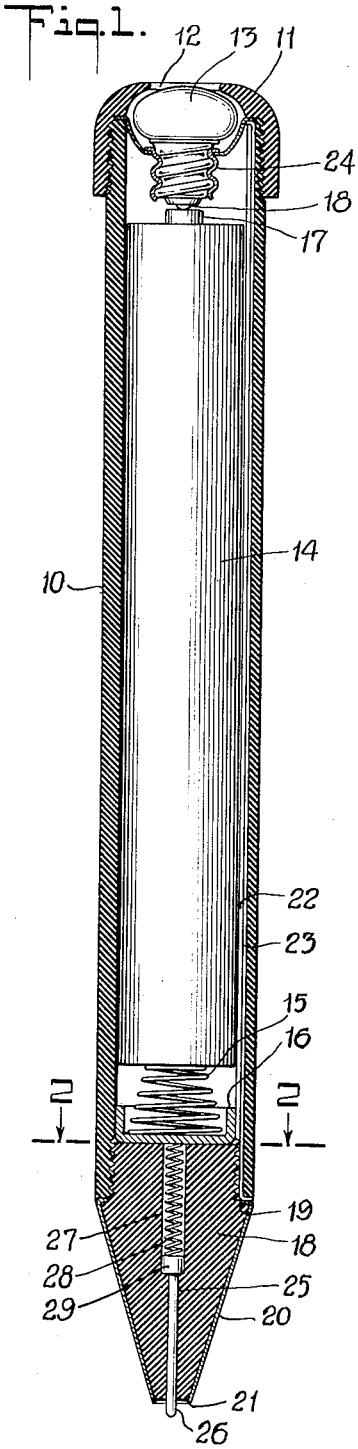
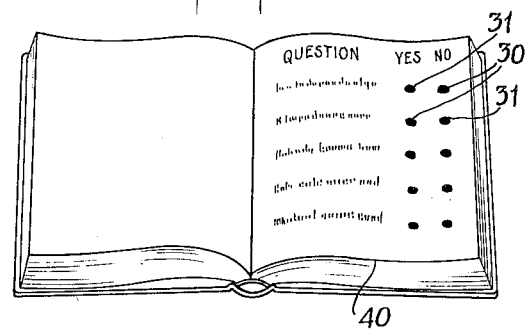
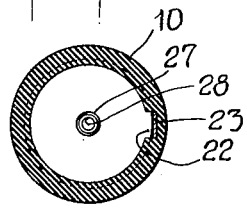
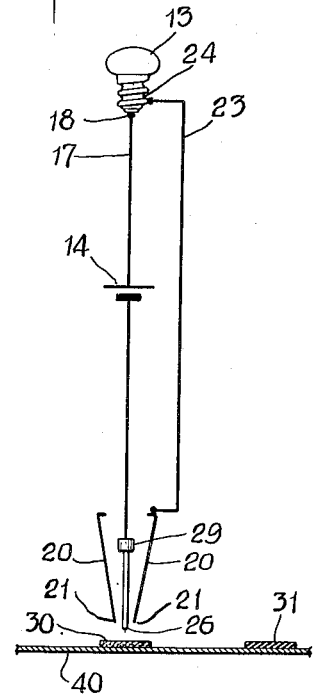
INVENTOR
Max Fleischer
BY
Henry J. Horridge
ATTORNEY Patented Mar. 27, 1951

2,546,666

UNITED STATES PATENT OFFICE 2,546,666

SELF-EXAMINATION DEVICE

Max Fleischer, New York, N. Y.

Application May 6, 1946, Serial No. 667,652

10 Claims. (Cl. 35—9)

This invention relates to an educational device of the electric questioner type, in which the accuracy of the answer selected to a given question is automatically indicated by a signal.

The prime object of my invention is to provide a device of the character stated which will give the appearance of employing the instrumentalities familiar in test or quiz work, which will be simple and natural to use, free of complicated electrical circuits, and inexpensive to manufacture and maintain.

The device of my invention comprises a question sheet or card, or a plurality of such sheets or cards arranged in book form, and a selecting instrument in the general form of a fountain pen. Each sheet has imprinted thereon a series of questions and opposite each question, an area, preferably in the form of a large printed dot indicating an affirmative answer and a like area indicating a negative answer. The dot of the correct answer is electro-conductive, while that of the incorrect answer is electro-non-conductive.

The selecting instrument carries all of the electrical elements except a short conductor to complete the circuit, which is provided by the dot of the correct answer when the selecting instrument is placed thereon and the electric lamp carried by the selecting instrument is thereupon energized and lighted.

The areas or dots referred to, whether conductive or non-conductive, are so similar in appearance as to prevent detection by the user, of the one which is conductive, so that in selecting the answer, the user must rely upon his knowledge, with no assistance from the device.

Other objects and advantages of the invention will be apparent from the description which follows, reference being made to the accompanying drawings, in which:

Fig. 1 is a longitudinal sectional view of the selecting instrument.

Fig. 2 is a cross section of the selecting instrument taken on the line 2—2 of Fig. 1 in the direction of the arrows.

Fig. 3 is a perspective view of the question book.

Fig. 4 is a diagram of the electric circuit.

The selecting instrument shown in Figs. 1 and 2 is merely one embodiment of that component of the device of my invention. Many variations are possible all within the scope of my invention. Likewise with respect to the circuit shown in Fig. 4.

The selecting instrument shown in Figs. 1 and 2 consists of the elongated tubular holder 10, which in this example is made of non-conductive material such for example as Bakelite. It is provided at its top with a cap 11 of like material provided with an aperture 12 as a window for the electric bulb 13. Cap 11 is screwed upon the holder 10, each being screw-threaded for that purpose. Within the holder 10 is a dry cell battery 14 of the ordinary flash lamp type with a low potential. Battery 14 is supported on coil spring 15 which in turn is supported by the metal cup 16, the spring 15 acting to force the battery 14 upwardly toward the cap end of the holder 10 so that the upper pole 17 is held in contact with terminal 18 of lamp 13 when the latter is in operative position.

To the lower end of holder 10 is attached, by screw threading, the conical member 18 which is reduced at shoulder 19 to permit its entry into the holder 10. The conical member 18 is of electro-non-conductive material, such as Bakelite, but it is provided with a metallic conductive shell 20 which is flanged over the shoulder 19 of the conical member 18 and completely encompasses the conical member from the shoulder 19 to the rim 21. If desired the holder 10 and conical member 18 could be molded in one piece.

A narrow groove 22 is formed in the inside wall of the tubular holder 10 to accommodate an electro-conductor strip 23 which at its upper end contacts the screw-threaded electro-conductive socket 24 of the lamp 13 and at its lower end contacts the flange at 19 of the shell 20. The depth of the groove 22 is sufficient to give safe clearance between the conductor strip 23 when mounted therein and the metallic cup 16.

Returning to the conical member 18, it will be seen that it is provided with a bore 25 to admit the electro-conductive stylus 26, which bore is enlarged at 27 to admit the coil spring 28 which is in contact at one end with metallic cup 16 and at the other end with the head 29 of the stylus 26. The action of spring 28 forces the stylus 26 outwardly.

The circuit, as diagrammatically shown in Fig. 4 is upper pole 17 of battery 14, terminal 18 of lamp 13, socket 24, conductor strip 23, shell 20 to its rim 21, and from the other pole of battery 14, spring 15, metallic cup 16, spring 28, stylus 26. It is not a complete circuit since stylus 26 is insulated from the shell 20 by an intervening portion of the conical member 18, but the gap in the circuit is closed when the selecting instrument is placed upon a conductive dot 30, and it remains broken if placed upon the electro-non-conductive dot 31. Although dots 30 and 31 are shown in Fig. 4 as raised surfaces, it will be understood that they may be flush with the surface of the sheet as will be the case when they are printed upon the sheet.

It is preferable to resiliently mount the stylus 26 as shown in Fig. 2 so that contact with a conductive dot 30 may be had by both stylus 26 and the rim 21 of shell 20 if the selecting instrument is applied to the dot in an inclined position and it reasonably may be expected that some inclination will be given by the user. Spring 28 is sufficiently light so that the weight of the selecting instrument alone, without added pressure by the user, will depress the stylus 26 when it is placed upon a dot, and if the dot is a conductive one 30, the electric circuit is thereby completed.

The question sheets 40 are preferably bound in book form as shown in Fig. 3 although my invention is not to be considered as limited thereto.

As shown in Fig. 3 the questions are given under the heading "Question" and opposite the question are the two dots 30 and 31 under the columnar headings "Yes" and "No." One of these dots, that which indicates the correct answer, is electro-conductive and the other is electro-non-conductive. The questions are printed and the dots are printed, but the ink employed in printing the dots 30 giving the correct answer is impregnated with an electro-conductive material, while the non-conductive dots 31 are printed in the usual manner with a non-conductive ink which simulates exactly in appearance the conductive dots 30; or both dots 30 and 31 may be printed with electro-conductive ink and the incorrect dots 31 may be then coated with an electro-non-conductive material, such as varnish, as preferred, but it is important, whatever method is selected, that the appearance of the conductive and non-conductive dots be the same so as to avoid detection by the user of the one or the other.

Within the term "question" I include an affirmative statement, and as employed in the appended claims the term "question" is to be so onderstood.

The questions may take a variety of forms of which I shall mention only a few examples. One example would be:

"Is New York city the capital of the State of New York?"     "Yes"     "No"

or

New York city is the capital of the State of New York     True     False

In this case a dot 30 or 31 would be provided under the headings Yes, No, True, False, and the dot under No and False would be the conductive dot 30.

Another example is the case where a group of possible answers to a given question is furnished. In vocabulary tests it is common to select a key word and give a number of meanings, only one of which is correct thus:

Select the correct meaning of the word "forbear" from the following:

(1) To use strength
(2) To carry ahead
(3) To refrain from some action

In this case, a dot would be imprinted alongside each given meaning (1), (2), and (3), the dot of the correct meaning (3) would be the conductive dot 30 and the dots of the others would be non-conductive.

The use of the device is quite obvious. The user reads the question, places the selecting instrument upon the dot he selects, using it practically as he would place a fountain pen upon it so that the stylus 26 and rim 21 make contact with the surface of the dot. If he has selected the correct answer, the conductive dot 30 of that answer closes the circuit between stylus 26 and rim 21 and the lamp 13 lights.

While I have called the device an educational device, it is apparent that within the scope of the invention it is particularly adapted to games.

I claim:

1. In a self-examination device, a question sheet having imprinted thereon at least one question and in association with each question at least two preformed imprinted markings of identical appearance, one of which is electro-conductive and the remainder thereof being electro-non-conductive.

2. In a self-examination device, at least one question sheet, each question sheet having imprinted thereon at least one question and in association with each question a plurality of preformed imprinted markings of identical appearance, one of which is electro-conductive and the remainder thereof being electro-non-conductive.

3. In a self-examination device, a question sheet having imprinted thereon a plurality of questions, and in association with each question a plurality of preformed imprinted markings of identical appearance, only one of said markings associated with a question being electro-conductive and the remainder of said markings associated with such question being electro-non-conductive.

4. In a self-examination device, a plurality of question sheets, bound together, each question sheet having imprinted thereon a plurality of questions, and in association with each question a plurality of preformed imprinted markings of identical appearance, only one of said markings associated with a question being electro-conductive and the remainder of said markings associated with such question being electro-non-conductive.

5. A self-examination device comprising at least one question sheet and an electro-sensing device by which the examinee makes his choice of answer by applying said electro-sensing device to said question sheet, each question sheet having imprinted thereon at least one question and in association with each question at least two preformed imprinted markings of identical appearance, one of which is electro-conductive and the remainder thereof being electro-non-conductive, the said electro-sensing device comprising a tubular casing having a signalling device mounted at one end of said casing, and a pair of contacts insulated from each other mounted at the other end of said casing, a battery contained in said casing, said signalling device, battery and contacts being connected in a circuit which is broken only between said contacts, said conductive marking being sufficient to close the said circuit between said contacts when the latter are placed thereon, thereby energizing said signalling device.

6. A self-examination device comprising at least one question sheet and an electro-sensing device by which the examinee makes his choice of answer by applying said electro-sensing device to said question sheet, each question sheet having imprinted thereon a plurality of questions, and in association with each question, a plurality of preformed imprinted markings of identical appearance, only one of said markings associated with a question being electro-conductive and the remainder of said markings associated with such question being electro-non-conductive, the said electro-sensing device comprising a tubular casing having a signalling device mounted at one end of said casing, and a pair of contacts insulated from each other mounted at the other end of said casing, a battery contained in said casing, said signalling device, battery and contacts being connected in a circuit which is broken only between said contacts, said conductive marking being sufficient to close the said circuit between said contacts when the latter are placed thereon, thereby energizing said signalling device.

7. A self-examination device comprising a plurality of question sheets and an electro-sensing device by which the examinee makes his choice of answer by applying said electro-sensing device to said question sheet each of said sheets having imprinted thereon at least one question and in association with each question at least two preformed imprinted markings of identical appearance, one of which is electro-conductive and the remainder of which are electro-non-conductive, said electro-sensing device comprising a casing containing a battery, a signalling device at one end and a pair of contacts at the other end connected in a circuit broken at said contacts.

8. An electro-sensing device for use in a self-examination device of the character described, comprising a tubular casing having a tapered end, an insulating block within said tapered end, concentric contacts at the extremity of said tappered end, one of which comprises a stylus resiliently and slidably mounted in a bore in said insulating block and normally protruding beyond said other contact, a removable cap at the other end of said casing, a signalling device and battery in said casing, said signalling device, battery and contacts being connected in a circuit broken only at said contacts.

9. A response sheet comprising a sheet of electro-non-conductive material, a plurality of questions imprinted on said sheet, a plurality of answering positions with respect to each question designated by preformed, separated markings of identical appearance imprinted upon said sheet, one of said answering position markings with respect to a question having been preformed of electro-conductive material, and the remainder of said answering position markings with respect to such question being electro-non-conductive.

10. A response sheet adapted to be sensed by an electrical sensing device, comprising a sheet of electro-non-conductive material, a plurality of questions imprinted on said sheet, a plurality of preformed, separated markings imprinted on said sheet in correspondence with each respective question designating the several answering positions with respect to each question, one only of said answering position markings with respect to a question having been preformed of an electro-conductive material visually indistinguishable from the remainder of such markings, such electro-conductive marking being sufficient when sensed by an electrical sensing device, to actuate an electro-sensing device.

MAX FLEISCHER.

REFERENCES CITED

The following references are of record in the file of this patent:

UNITED STATES PATENTS

| Number | Name | Date |
| --- | --- | --- |
| 1,253,282 | Ruckhardt | Jan. 15, 1918 |
| 1,928,565 | Kindig | Sept. 26, 1933 |
| 1,932,443 | Britsch | Oct. 31, 1933 |
| 1,997,157 | Tausckek | Apr. 9, 1935 |
| 2,084,848 | Lasker | June 22, 1937 |
| 2,107,008 | Lasker | Feb. 1, 1938 |
| 2,171,556 | Higginbottom | Sept. 5, 1939 |
| 2,272,411 | Johnson | Feb. 10, 1942 |